United States Patent
Pierce et al.

(10) Patent No.: US 10,912,686 B2
(45) Date of Patent: Feb. 9, 2021

(54) WHEELCHAIR DOLLY

(71) Applicants: Pearce J. Pierce, Springfield, MA (US); Jason C. Vilardi, Fort Myers, FL (US)

(72) Inventors: Pearce J. Pierce, Springfield, MA (US); Jason C. Vilardi, Fort Myers, FL (US)

( * ) Notice: Subject to any disclaimer, the term of this patent is extended or adjusted under 35 U.S.C. 154(b) by 0 days.

(21) Appl. No.: 16/401,473

(22) Filed: May 2, 2019

(65) Prior Publication Data
US 2020/0345565 A1     Nov. 5, 2020

(51) Int. Cl.
  *B62B 3/02*     (2006.01)
  *A61G 3/08*     (2006.01)
  *B62B 5/04*     (2006.01)

(52) U.S. Cl.
  CPC ............ *A61G 3/0808* (2013.01); *B62B 3/025* (2013.01); *B62B 5/0447* (2013.01); *B62B 2202/90* (2013.01)

(58) Field of Classification Search
  CPC .................................. B62B 3/02; B62B 3/04
  USPC ................................. 280/47.34, 47.35, 47.38
  See application file for complete search history.

(56) References Cited

U.S. PATENT DOCUMENTS

| | | | |
|---|---|---|---|
| 3,612,603 A | 10/1971 | Snyder et al. | |
| 3,962,737 A * | 6/1976 | James | A61G 7/1019 5/83.1 |
| 4,257,644 A * | 3/1981 | Stephens | A61G 3/0808 296/65.04 |
| 4,805,938 A | 2/1989 | Redmond et al. | |
| 4,846,156 A * | 7/1989 | Kopnicky | A61H 1/0214 601/36 |
| 4,902,029 A * | 2/1990 | Gain | A61G 5/027 280/250.1 |
| 5,207,286 A * | 5/1993 | McKelvey | A61G 5/047 180/13 |
| 5,312,127 A * | 5/1994 | Oxford | A61G 5/023 280/250.1 |
| 5,522,121 A | 6/1996 | Fraynd et al. | |
| 5,529,427 A | 6/1996 | Bost | |
| 5,556,076 A * | 9/1996 | Jacquay | B62B 3/04 254/131 |
| 5,918,892 A | 7/1999 | Aaron et al. | |
| 6,086,085 A * | 7/2000 | Larsson | A61G 5/00 280/304.1 |
| 6,273,444 B1 | 8/2001 | Power | |
| 6,601,866 B1 | 8/2003 | Dobies | |
| 6,676,140 B1 | 1/2004 | Gondobintoro | |

(Continued)

*Primary Examiner* — Jeffrey J Restifo
(74) *Attorney, Agent, or Firm* — Dunlap Bennett & Ludwig, PLLC

(57) ABSTRACT

A wheelchair dolly is provided. The wheelchair dolly includes two spaced apart frame elements, each movable in concert between a folded position and an extended position for supporting two or more wheelchairs for transportation. Each frame element may serially provide a front, middle and rear sections, wherein the front and middle sections are pivotal about a distal end of the rear section for moving between the extended and folded positions. The rear sections may each provide a rear wheel and a handle portion interconnected by a brake system for selectively braking the rear wheels. Bracing and crossbars may secure the frame elements in their spaced apart arrangement.

8 Claims, 4 Drawing Sheets

(56) References Cited

U.S. PATENT DOCUMENTS

| | | | |
|---|---|---|---|
| 6,685,200 B1* | 2/2004 | Giannoni | B62B 3/02 |
| | | | 108/57.16 |
| 7,306,250 B1* | 12/2007 | Mills | A61G 5/047 |
| | | | 180/11 |
| 7,644,932 B2* | 1/2010 | Heng | A61G 5/10 |
| | | | 280/250.1 |
| 7,774,873 B2* | 8/2010 | Martin | A61G 5/10 |
| | | | 5/611 |
| 8,220,822 B2 | 7/2012 | Cohen et al. | |
| 8,276,935 B2 | 10/2012 | Minato et al. | |
| 8,326,473 B2 | 12/2012 | Simpson et al. | |
| 8,408,564 B2* | 4/2013 | Hutchinson | B62B 3/04 |
| | | | 280/47.34 |
| 8,757,646 B2 | 6/2014 | Coleraine et al. | |
| 8,960,352 B2* | 2/2015 | Avigad | A61G 5/104 |
| | | | 180/198 |
| 9,592,845 B2* | 3/2017 | Palma | B62B 3/04 |
| 9,701,329 B2* | 7/2017 | Johnson | B62D 51/04 |
| 9,809,241 B2* | 11/2017 | Polidoros | B62B 3/04 |
| 10,106,184 B2* | 10/2018 | Johnson | B62B 5/087 |
| 10,597,057 B1* | 3/2020 | Hilmerson | B62B 3/04 |
| 2009/0001689 A1 | 1/2009 | Swenson | |
| 2009/0026733 A1 | 1/2009 | Gray | |
| 2015/0232114 A1 | 8/2015 | Gillett | |

* cited by examiner

WHEELCHAIR DOLLY

BACKGROUND OF THE INVENTION

The present invention relates to wheelchairs and, more particularly, a wheelchair dolly.

Wheelchairs allow their users who either cannot walk or have trouble walking to be more mobile than they otherwise would be. But many of the same wheelchair users who cannot walk or have trouble walking cannot urge or have trouble urging their wheelchair, especially with alacrity. And so, in emergencies or other situations demanding expedition movement an ambulatory caregiver would ideally be pushing the wheelchair. However, in emergencies caregivers may be short-handed.

Additionally, when unused wheelchairs are being transported, they typically have to be moved one at a time, even if they can fold up because of their weight and bulkiness. Moreover, folding-up and unfolding wheelchairs adds time to the transportation process. Furthermore, the individual entrusted to fold-up and unfold such wheelchairs may lack the knowhow to do it safely or efficiently, leading to additional wasted time as well as frustration, and/or possibly a safety hazard.

As can be seen, there is a need for a wheelchair dolly dimensioned and adapted to move at least two patients in wheelchairs at one time, while cutting wheelchair evacuation/transportation time in half.

SUMMARY OF THE INVENTION

In one aspect of the present invention, a wheelchair dolly includes the following: two spaced apart frame elements, each frame element serially providing a L-shaped rear section, a middle section, and a front portion, wherein the middle section is connected to a distal end of the L-shaped rear section and a proximal end of the front section by way of pivotal attachment points; a rear wheel rotatably joined to a lower leg of each L-shaped rear section; a handle portion provided by an upper leg of each L-shaped rear section; a braking system interconnecting the handle portions and the rear wheels; and a front wheel rotatably joined to each front section, wherein each frame element is movable between an extended position and a folded position defining a general J-shape.

In another aspect of the present invention, the wheelchair dolly includes the following: two spaced apart frame elements, each frame element serially providing a L-shaped rear section, a middle section, and a front portion, wherein the middle section is connected to a distal end of the L-shaped rear section and a proximal end of the front section by way of pivotal attachment points; a rear wheel rotatably joined to a lower leg of each L-shaped rear section; a handle portion provided by an upper leg of each L-shaped rear section; a braking system interconnecting the handle portions and the rear wheels; a front wheel rotatably joined to each front section, wherein each frame element is movable between an extended position and a folded position defining a general J-shape, wherein the middle sections and the lower legs of the L-shaped rear sections are each approximately two inches in diameter and dimensioned to accommodate all four wheels of a wheelchair; and a crossbar interconnected the spaced apart middle sections and the spaced apart front sections, respectively, in the extended position, wherein each crossbar interconnects the upper legs of the L-shaped front section and the front sections, respectively, in the folded position.

These and other features, aspects and advantages of the present invention will become better understood with reference to the following drawings, description and claims.

DETAILED DESCRIPTION OF THE INVENTION

Figure 1:
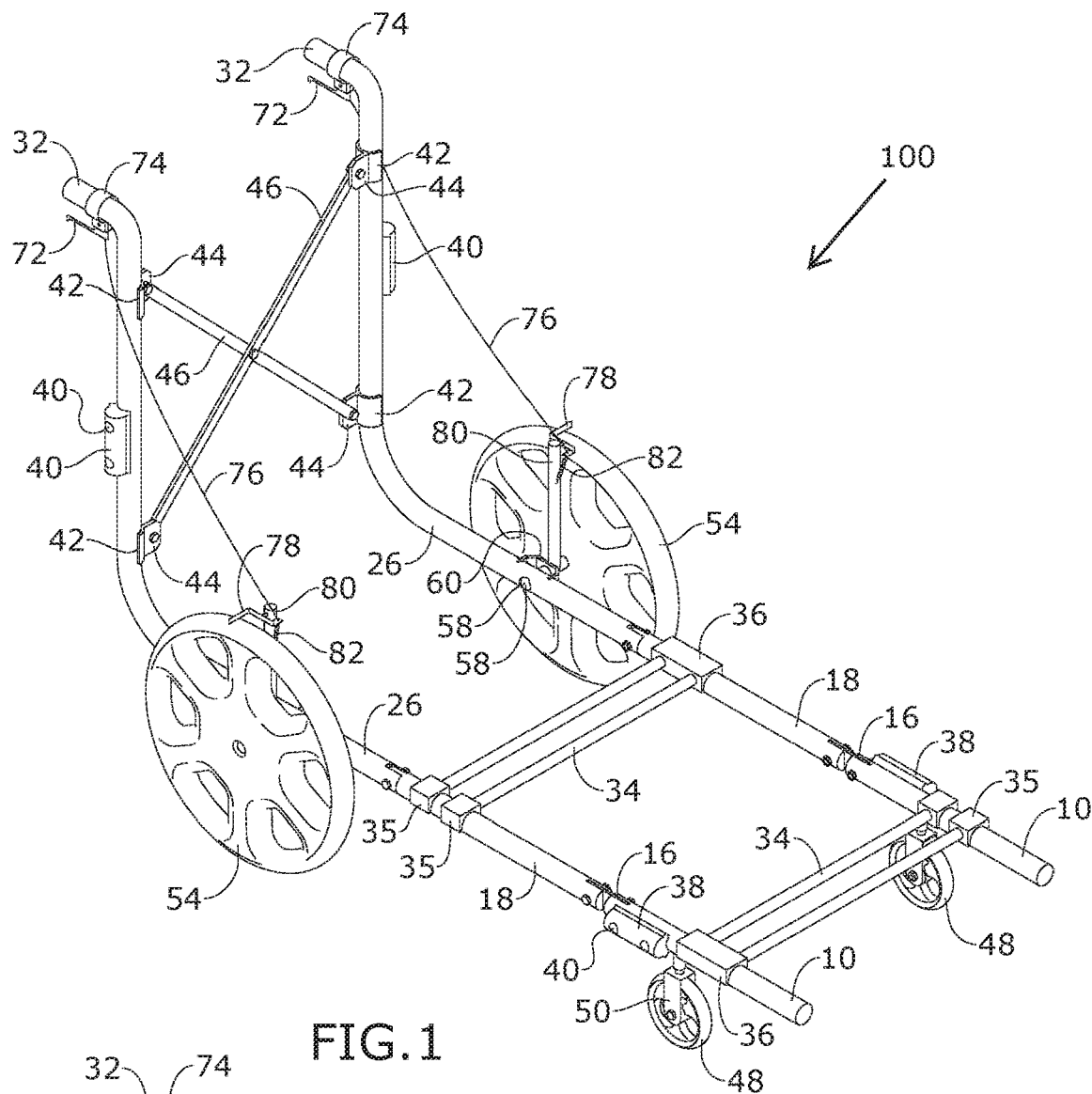
FIG. 1 is a perspective view of an exemplary embodiment of the present invention, shown in an extended position.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a wheelchair dolly providing two spaced apart frame elements which are movable between a folded position and an extended position for supporting two or more wheelchairs for transportation. Each frame element may provide a front, middle and rear sections, wherein the front and middle sections are pivotal about a distal end of the rear section for moving between the extended and folded positions. The rear sections may each provide a rear wheel and a handle portion interconnected by a brake system for selectively braking the rear wheels. Bracing and crossbars may secure the frame elements in their spaced apart arrangement.

The present invention may include a wheelchair dolly 100 dimensioned and adapted to move at least two patients in wheelchairs 70 at one time. The wheelchair dolly 100 has two spaced apart frame elements 90 dimensioned to accommodate at least two wheelchairs 70, thereon. Each frame element 90 may include a rear section 26, a middle section 18, and a front section 10 connected in series, respectively, as the wheelchair dolly 100 extends from a front portion to a rear portion. The middle section 18 may extend between two and six feet. The two spaced apart frame elements 90 may be interconnected by crossbars 34.

The rear section 26 extends from a handle portion 32 to a distal rear portion 84. The rear section 26 may be generally L-shaped as the handle portion 32 is at a higher elevation than the distal rear portion 84 during operation. The distal rear portion 84 provides a rear slot 28. The rear section 26 may extend between two and six feet.

The middle section 18 extends from a middle tab 22 to a middle slot 20. The middle slot 20 is dimensioned to be slidably received in the rear slot 28, both having aligned fastener holes so that a long fastener 64 (such as a bolt) and auxiliary fasteners 66 and 68 (such as nuts and washers) can removable secure the middle and rear sections 18 and 26 together.

The front section 10 extends from a front slot 12 to a distal front portion. The middle slot 20 and the front slot 12 have fastener holes. The middle slot 20 and the front slot 12 are dimensioned to slidably receive a tab connector 16 having opposing fastener holes so that when the opposing ends of the tab connector 16 are slidably received in the middle and front slots 20 and 12, respectively, a long fastener 64 (such as a bolt) and auxiliary fasteners 66 and 68 (such as nuts and washers) removable secure the middle and front sections 18 and 10 together.

Figures 5, 6:
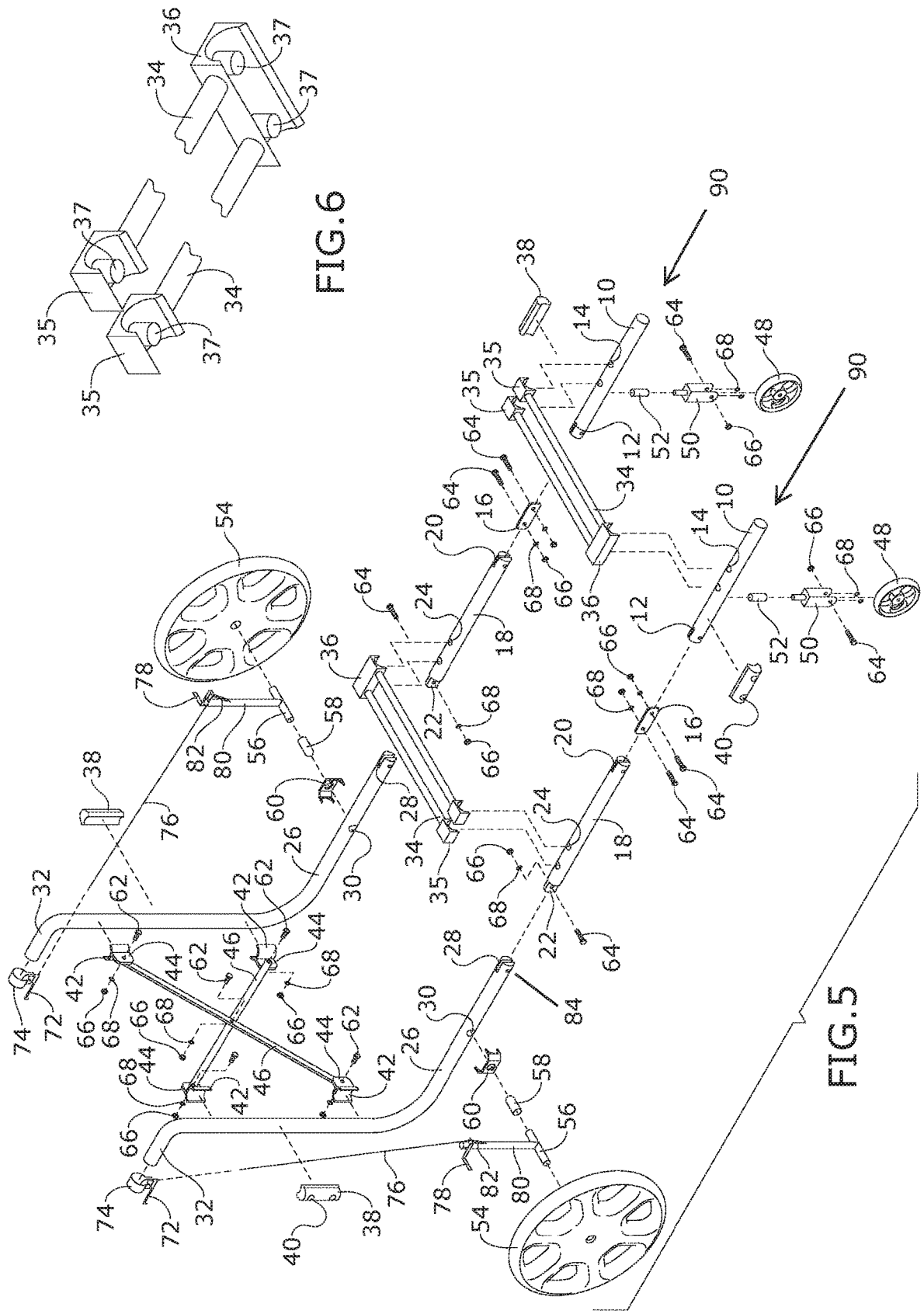
FIG. 5 is a top perspective exploded view of an exemplary embodiment of the present invention.
FIG. 6 is a detailed bottom perspective view of a crossbar assembly of an exemplary embodiment of the present invention.

Each middle and front section 18 and 10 may provide crossbar slots 24 and 14, respectively, for slidably receiving crossbar tabs 37 at the opposed ends of the crossbars 34, see FIGS. 5 and 6. Such crossbar tabs may protrude from the concaved portion of single or double grips 35 and 36, respectively, wherein the concaved portions abut the upper curved surface of the respective sections 18 and 10 in a gripping position.

Each front section 10 may be coupled to front wheels 48 by way of a front fork 50 and front bearings 52 with the assistance of a long fastener 64 (such as a bolt) and auxiliary fasteners 66 and 68 (such as nuts and washers).

Each rear section 26 may be coupled to rear wheels 54 by way of a rear axle 56, rear bracket 60, and rear bearings 60 with the assistance of long fastener 64 (such as a bolt) and auxiliary fasteners 66 and 68 (such as nuts and washers).

A braking handles 74 may interconnect the rear wheels 54 and the handle portions 32 by way of brake clamps 74, brake cables 76, brake posts 80, brake springs 82 and brake pads 78, respectively.

A brace 46 may interconnected the upper-portion of the L-shaped rear sections 26, the brace having brace brackets 42 and bracket tabs 44 to facilitate the respective connections, with the assistance of short and long fastener 62 and 64 (such as a bolt) and auxiliary fasteners 66 and 68 (such as nuts and washers).

Clamps 38 with clamp slots 40 may connect to some of the sections 10, 18, 26, as illustrated in the Figures.

Figure 2:
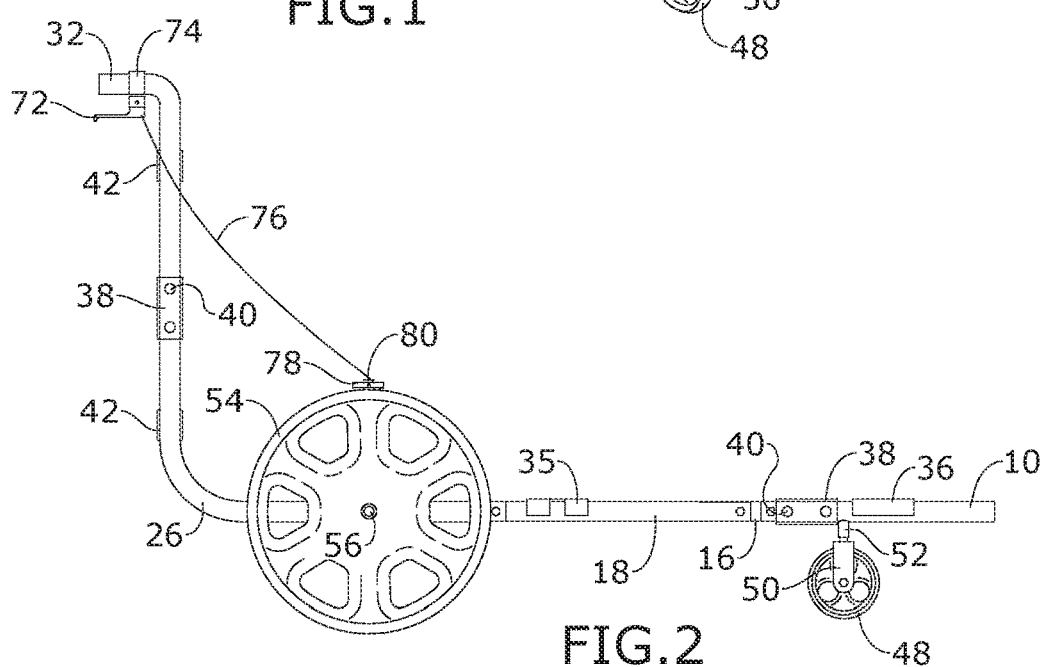
FIG. 2 is a side view of an exemplary embodiment of the present invention, shown in the extended position.
Figure 3:
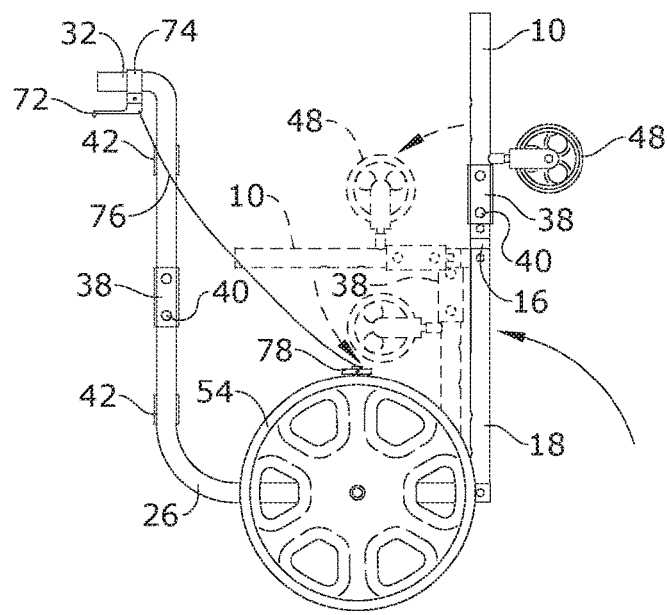
FIG. 3 is a side view of an exemplary embodiment of the present invention, with crossbar 34 removed, illustrating a folding action.
Figure 4:
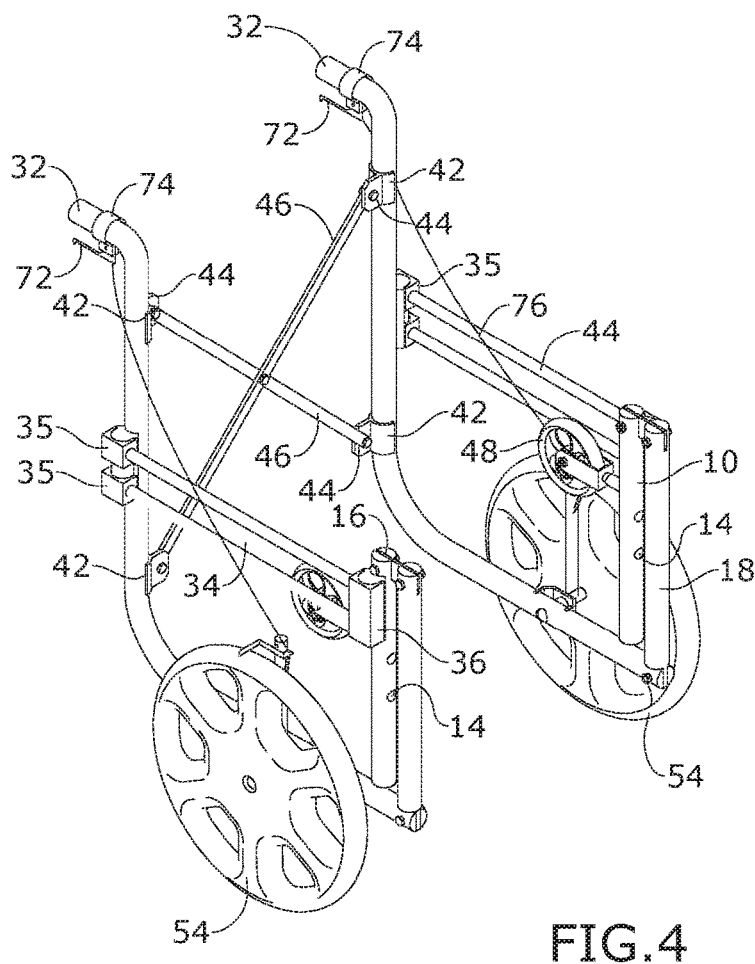
FIG. 4 is a perspective view of an exemplary embodiment of the present invention, shown in a folded position.

The wheelchair dolly 10 is movable between an extended position (FIGS. 1 and 2) and a folded position (FIGS. 3 and 4) by rotating or pivoting each tab-slot attachment point (e.g., the middle and rear sections 18 and 26 about the rear slot 28 fastener hole; the middle and front sections 18 and 10 about the attachment point of the opposing tabs of the tab connector 16 and the middle and front slots 120 and 12, respectively), wherein the long fastener 64 either acts like a pivot pin in a loosen state (or is removed to facilitate the folded position) and then retightened to secure the folded position, as illustrated in FIG. 3. The folded position may have a J-shape, and the crossbars 34 may extend between an upper leg of the L-shaped rear section 26 and the folded-in front section 10, as illustrated in FIG. 4.

Figure 7:
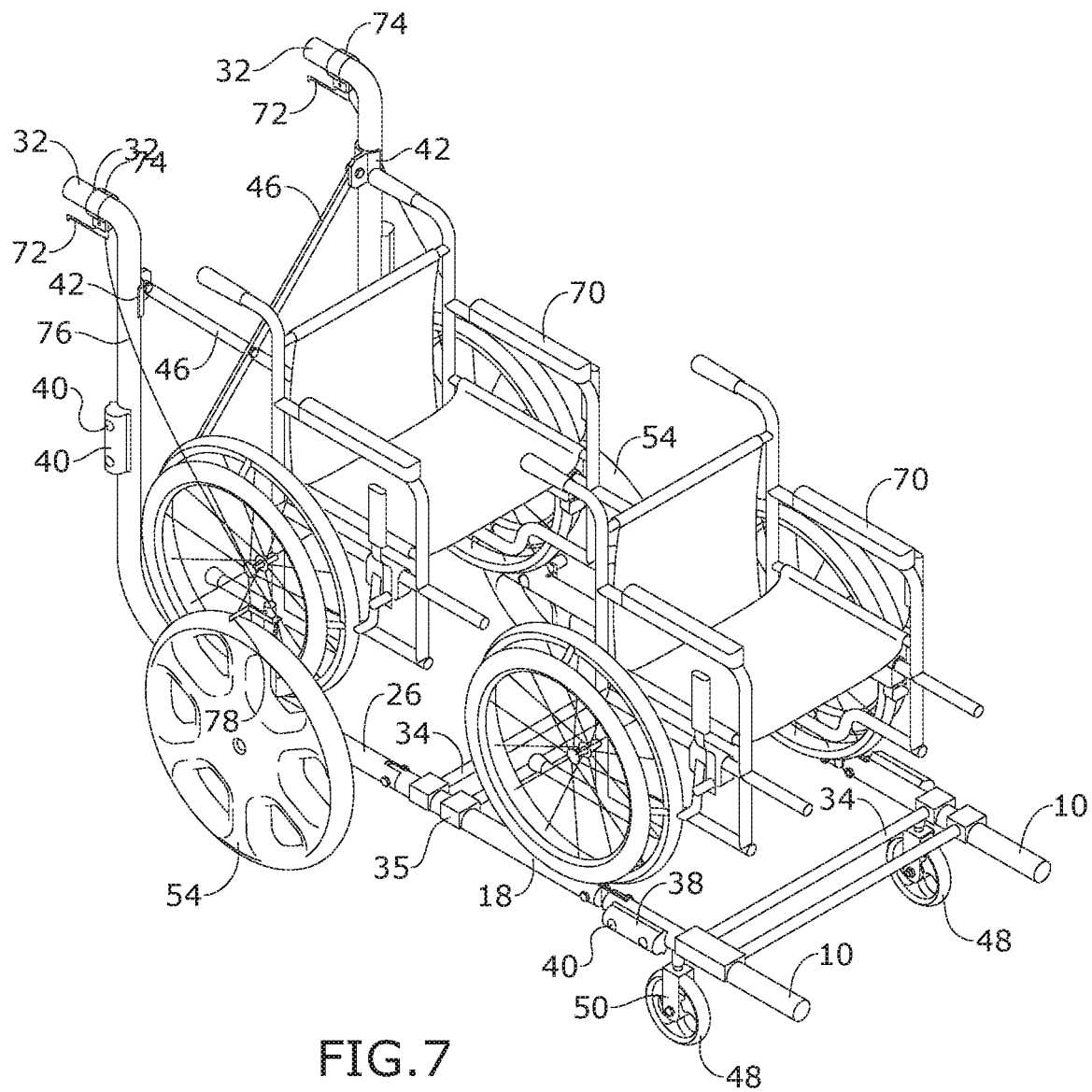
FIG. 7 is a perspective view of an exemplary embodiment of the present invention, shown in use.

In the extended position, two or more wheelchairs 70 may be supported on the two spaced apart frame elements 90 as illustrated in FIG. 7, wherein the double wheels of the wheelchair 70 wheels nests on top of the rear section 26 and the middle section 18, such section 26 and 18 are dimensioned accordingly—in certain embodiments they may be approximately one to three inches in circumference.

It should be understood, of course, that the foregoing relates to exemplary embodiments of the invention and that modifications may be made without departing from the spirit and scope of the invention as set forth in the following claims.

What is claimed is:

1. A wheelchair dolly, comprising:
   two spaced apart frame elements, each frame element serially comprising:
   a rear section having an L-shape or J-shape defining a frame plane;
   a middle section; and
   a front section, wherein the middle section is connected to a distal end of the rear section and a proximal end of the front section by way of pivotal attachment points;
   a rear wheel rotatably joined to a lower leg of each rear section;
   a handle portion provided by an upper leg of each rear section;
   a braking system interconnecting the handle portions and the rear wheels; and
   a front wheel rotatably joined to each front section, wherein each frame element is movable between an extended position and a folded position wherein the middle section pivots relative to both the rear section and the front section along the frame plane.

2. The wheelchair dolly of claim 1, wherein the middle sections and the lower legs of the rear sections are each dimensioned to accommodate all four wheels of a wheelchair.

3. The wheelchair dolly of claim 2, wherein the middle sections and the lower legs of the rear sections are approximately two inches in diameter.

4. The wheelchair dolly of claim 1, wherein the pivotal attachment points are defined by tab-slot attachments.

5. The wheelchair dolly of claim 1, a crossbar interconnected the spaced apart middle sections and the spaced apart front sections, respectively, in the extended position.

6. The wheelchair dolly of claim 5, wherein each crossbar interconnects the upper legs of the rear section and the front sections, respectively, in the folded position,
   whereby each crossbar is multipurpose: bracing both, separately, the extended position and the folded position.

7. The wheelchair dolly of claim 1, wherein the middle section and the front section of each frame element are contiguous to each other while coplanar with the frame plane in the folded position.

8. A wheelchair dolly, comprising:
   two frame elements spaced apart from each other, each frame element serially comprising:
   a rear section having an L-shape or J-shape defining a frame plane;
   a middle section; and
   a front section, wherein the middle section is connected to a distal end of the rear section and a proximal end of the front section by way of pivotal attachment points;
   a rear wheel rotatably joined to a lower leg of each rear section;
   a handle portion provided by an upper leg of each rear section;
   a braking system interconnecting the handle portions and the rear wheels;
   a front wheel rotatably joined to each front section, wherein each frame element is movable between an extended position and a folded position wherein the middle section pivots relative to both the rear section and the front section along the frame plane, wherein the middle section and the front section of each frame element are contiguous with each other while coplanar with the frame plane in the folded position; and a crossbar interconnected the spaced apart middle sections and the spaced apart front sections, respectively, in the extended position, wherein each crossbar interconnects the upper legs of the rear section and the front sections, respectively, in the folded position, whereby each crossbar is multipurpose: bracing both, separately, the extended position and the folded position.

* * * * *